Oct. 15, 1940.	A. RONNING	2,217,817
VEHICLE SUPPORTING DEVICE
Filed Dec. 26, 1939
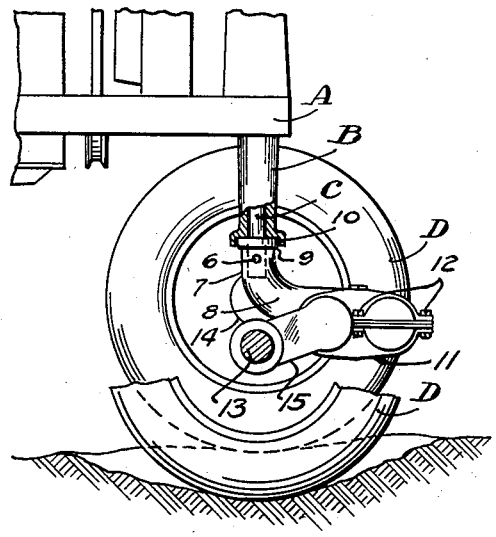
Fig-1-
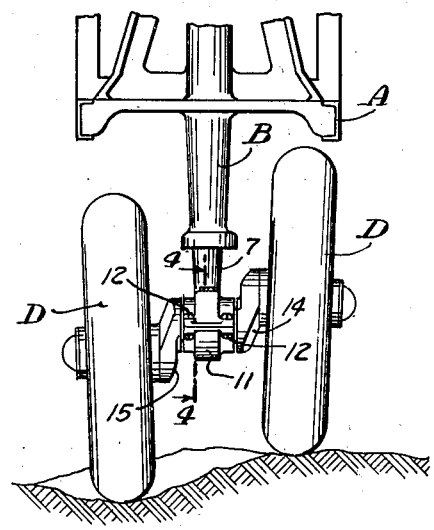
Fig-2-
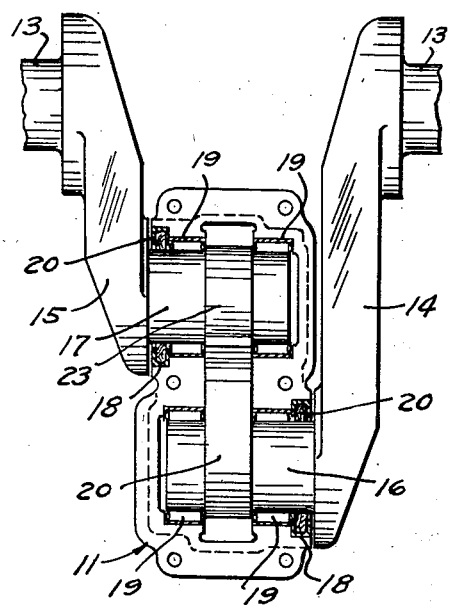
Fig-3-
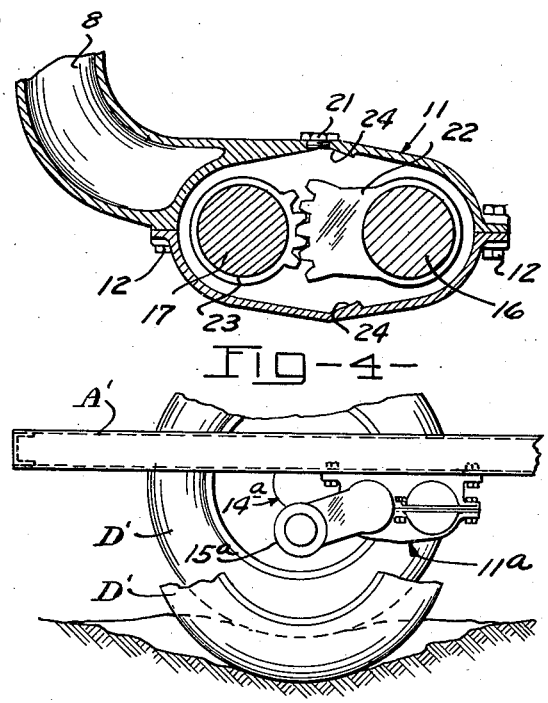
Fig-4-
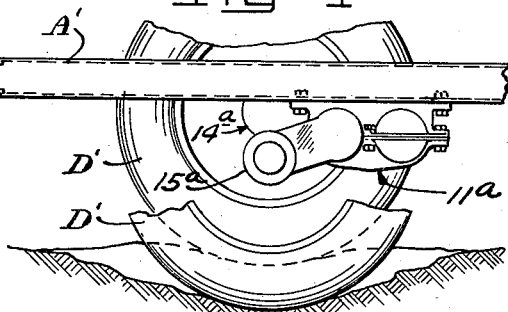
Fig-5-
INVENTOR
ADOLPH RONNING
BY *Carlsen & Hayle*
ATTORNEYS Patented Oct. 15, 1940

2,217,817

UNITED STATES PATENT OFFICE 2,217,817

VEHICLE SUPPORTING DEVICE

Adolph Ronning, Minneapolis, Minn.

Application December 26, 1939, Serial No. 310,942

14 Claims. (Cl. 280—87)

This invention relates to improvements in supporting devices or trucks for vehicles, and more particularly to improvements in such devices for use on vehicles of the automotive type.

The primary object of the invention is to provide a simple, effective, and practical means for mounting a pair of closely spaced wheels so that they may be steered about a central upright axis but so that they may have freedom for differential vertical or up and down motion to thereby facilitate travel and steering over irregular ground surfaces while maintaining constantly equal load distribution to the wheels. A further object is to provide a device of this kind wherein the wheels are connected by crank members to the steering or mounting member and in which said crank members, although of uneven length, are differentially connected in such manner that the wheels will move up and down equal and opposite amounts at all times and with the load evenly distributed to the wheels.

This invention is similar in its general purpose and functioning to several of my other co-pending applications, and for a disclosure of other forms of such devices reference is invited to Serial No. 219,369, filed July 15, 1938; Serial No. 242,725 and Serial No. 242,726, filed November 28, 1938, now Patents Nos. 2,208,599 and 2,208,600 of July 23, 1940; Serial No. 244,019, filed December 5 1938 now Patent No. 2,208,601 of July 23, 1940; Serial No. 247,608, filed December 24, 1938, now Patent No. 2,209,093 of July 23, 1940; and Serial No. 250,344 and Serial No. 250,345, filed January 11, 1939, now Patents Nos. 2,209,094 and 2,209,095 of July 23, 1940.

In the drawing:

Fig. 1 is a side elevation of the forward lower portion of a tractor equipped with my invention for mounting the ground wheels thereof, the wheels being shown as running over an irregular ground surface and the near wheel being in greater part broken away to better disclose the construction.

Fig. 2 is a front end view of the structure shown in Fig. 1.

Fig. 3 is an enlarged horizontal view of the lower section of the housing and adjacent ends of the crank members mounted therein, with bearing means for said members shown in cross section.

Fig. 4 is an enlarged section along the line 4—4 in Fig. 2, the crank members being omitted.

Fig. 5 is a side elevation of a vehicle frame portion equipped with a supporting means similar to that shown in Fig. 1, but not arranged for steering purposes.

Referring to the drawing more particularly and by reference characters, A designates the frontal portion of a tractor frame in the front end of which is arranged a vertically axised tubular bearing B through which extends a journaled steering post C. At the rear the tractor is provided with the usual transversely spaced traction wheels (not shown) which give the necessary lateral stability. The steering post C is oscillated about its vertical axis by any conventional steering mechanism (not here shown) such as is disclosed in several of my copending applications hereinbefore identified, and the front ground wheels D are connected to this post to be angled thereby for steering purposes. These wheels D are closely spaced since they are not required to give lateral stability to the tractor and also because they may then travel between crop rows where the machine is used for row crop work.

The lower end of the steering post C depends from the bearing B for the attachment by pin or other means 6 to the upwardly turned rear end 7 of a steerable mounting member 8, said member having a flanged end 9 bearing in a recess 10 at the underside of the bearing B to support the forward end of the tractor. An anti-friction bearing may of course be used at this point. The member 8, preferably made hollow for lightness and strength, extends forwardly and at its forward end is integrally connected to a housing 11. Said housing is horizontally elongated in a fore and aft plane and made up of upper and lower complementary sections secured together by bolts 12 and the upper section is integral with member 8 as clearly shown. The member 8 and housing 11 will thus turn as a unit with the steering post C as the tractor is steered.

The wheels D are journaled on spindles 13 extending rigidly from the rear ends of crank members or arms 14 and 15 disposed on opposite sides of the housing 11 and provided at their forward ends with stub shafts 16 and 17, respectively, which extend in parallelism and in horizontally spaced, fore and aft positions into the housing. Said stub shafts enter the opposite sides of the housing 11 through openings 18 formed at the parting line between upper and lower housing sections and are journaled in transversely spaced anti-friction bearings 19, the said openings being sealed by oil rings 20 so that the interior of the housing may be filled with lubricating oil if so desired. A removable plug 21 is provided in the upper housing section for this purpose, as shown in Fig. 4.

The spindles 13 are slightly sloped outwardly to give the necessary camber to the wheels D as shown in Fig. 2, but it should be noted that any relative up and down movement of the wheels about the axes of the stub shafts 16 and 17 will not disturb either this camber of the wheels or produce any relative transverse movement of the wheels such as would cause undesirable frictional ground contact. It should also be noted that, although the forward extension of the members 8 disposes the journaled ends of the crank members forwardly of the steering axis, the cranks both extend rearwardly at their wheel supported ends whereby the wheels operate directly opposite the upright steering axis and in transverse alignment therewith. The wheels will thus steer without unusual resistance.

The inner ends of the stub shafts 16 and 17 are provided with gears or gear segments 22 and 23 respectively, said gears being secured rigidly to the shafts to turn therewith and being arranged within the housing 11 between the bearings in meshing engagement to thereby differentially connect the cranks 14 and 15. Due to the horizontal, longitudinal, or fore and aft spacing between the shafts 16 and 17, the cranks 14 and 15, in order to bring the wheels D into substantial transverse alignment with each other and with the steering axis, are necessarily of uneven length. The crank 14 is therefore longer than crank 15 by the amount of this spacing between the stub shafts. Accordingly, to evenly distribute the weight and pressure to the respective wheels D with the unequal leverages existent in these cranks, the gear 22 connected to the longer crank is made of greater diameter or greater pitch diameter than the gear 23 connected to shorter crank 15, thus substantially equalizing the load. Likewise the vertical movement of the wheel D on the longer crank is substantially the same as that of the wheel on shorter crank 15, due to the relative ratio between the gears 22 and 23, although such movements are at all times in relatively opposite up and down directions due to the differential action of the gears.

The housing 11 has angularly faced-off stops or stop members 24 which will engage the longer or extended portion of the gear 22 and so limit the swinging movements of the cranks 14 and 15 within certain extremes.

It will be understood that as the weight of the vehicle is imposed on the housing 11 it will be transmitted through the gears 22 and 23, the stub shafts 16 and 17 and cranks 14 and 15 to the wheels D, all of which parts will remain substantially stationary when the vehicle is traveling over an even ground surface. When uneven surfaces are encountered, as indicated in Figs. 1 and 2, then the gears 22 and 23 will function to permit the wheels to assume relative vertical positions to maintain even ground contact, either crank 14 or 15 moving upwardly or downwardly while the other moves in the opposite direction as may be required. The applied weight will, however, be evenly and equally distributed to the wheels at all times.

As shown in Fig. 5, my device may be used as supporting means for other types or parts of vehicle frames and without any steering connections. For example a trailer vehicle having a frame A' might be provided (at each side) with a pair of ground wheels D' operating upon opposite sides of the longitudinal member of the frame. The housing 11a in this case would be secured directly to the frame as clearly shown, and the crank members or arms 14a and 15a extended from said housing and connected to the wheels. The construction is similar to that hereinbefore described in detail and obviously the wheels may adjust themselves in the same manner to road irregularities which maintain equal load distribution between the wheels.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle steering device comprising a mounting member adjustable about an upright axis to effect steering, a pair of wheel supported cranks of unequal lengths journaled at their forward ends at opposite sides of the member on transverse and longitudinally spaced axes for oscillating movement about said transverse axes in generally vertical planes, and gears on the journaled ends of the cranks differentially connecting the same to move them in opposite directions.

2. A vehicle supporting device comprising a mounting member, a pair of wheel supported cranks journaled at longitudinally corresponding ends at opposite sides of the member on transverse and longitudinally spaced axes for oscillating movement about said axis in generally vertical planes, the said cranks being of unequal length to dispose the wheels in transverse alignment, and means differentially connecting the cranks to translate the up movement of one into a down movement of the other.

3. A vehicle supporting device comprising a housing, a pair of cranks journaled at forward ends to the housing on longitudinally spaced axes and extending rearwardly therefrom, the said cranks being of unequal length, ground wheels rotatably secured on the cranks and, because of the unequal lengths of the cranks, being disposed in substantially transverse alignment, and differentially acting means connecting the cranks to oscillate them in opposite directions.

4. A vehicle supporting device comprising a housing, a pair of wheel supported cranks journaled forwardly on longitudinally and horizontally spaced axes to the housing for relative vertical oscillating movements at their rear, wheel supported ends, one of the said cranks being of greater length than the other to thereby bring the wheels into substantially transverse alignment, and differentially operating means connecting the cranks to move them in relatively opposite directions.

5. A vehicle supporting device comprising a housing, a pair of crank members of unequal length journaled at one end in the housing on longitudinally spaced axes and extended in the same direction therefrom for up and down oscillating movements, substantially aligned ground wheels rotatably secured on the crank members, gears differentially connecting the crank members, for equalizing the leverage action and reversing the movements of the crank members.

6. A vehicle supporting device comprising a mounting member, a pair of crank arms journaled in said member on transversely extending and longitudinally spaced axes to extend rearwardly therefrom, ground wheels rotatably secured on the crank arms in substantially transverse alignment with each other and thereby being located at unequal distances from said longitudinally spaced journal axes, and means differentially connecting the crank arms to move them in opposite directions while also being operative to equalize the load distribution through said crank arms to the wheels.

7. A vehicle supporting device comprising a mounting member, a pair of relatively long and short crank arms journaled in said member on transversely extending and longitudinally spaced axes, ground wheels rotatably secured on the crank arms in substantially transverse alignment with each other and thereby being located at unequal distances from said longitudinally spaced journal axes, and differential gears of unequal ratio connecting the said crank arms for equalizing the effective leverage of the arms.

8. A vehicle supporting device comprising a mounting member, a pair of relatively long and short crank arms journaled in said member on transversely extending and longitudinally spaced axes, ground wheels rotatably secured on the crank arms in substantially transverse alignment with each other and thereby being located at unequal distances from said longitudinally spaced journal axes, and a pair of gears differentially connecting the crank arms, the said gears being of unequal diameter to thereby equalize the load distribution to the arms.

9. A vehicle supporting device comprising a housing, a pair of wheel supported cranks journaled on longitudinally and horizontally spaced axes on the housing for relative vertical oscillating movements at their wheel supported ends, one of the said cranks being of greater length than the other to thereby bring the wheels into substantially transverse alignment with each other, gears on the respective cranks differentially connecting the same, and the gear connected to the longer crank being of greater radius than the gear connected to the shorter crank.

10. A vehicle supporting device comprising a housing, a pair of wheel supported cranks journaled at front ends on longitudinally and horizontally spaced axes in the housing for relative vertical oscillating movements at their wheel supported rear ends, and the said wheels being located on the cranks in substantially transverse alignment with each other and thereby being unequally spaced with respect to the journal axes of the cranks, intermeshing gears on the cranks for differentially connecting the same, and the gear connected to the crank having the greatest spacing between journal axis and wheel axis being of correspondingly greater diameter than the other gear.

11. A steerable vehicle supporting truck comprising a member mounted for oscillation about a generally vertical axis to effect steering, a pair of wheel supported cranks journaled at forward ends on the member on transversely extending and longitudinally spaced axes, the said wheels being connected to the cranks in substantially transverse alignment with each other and in the transverse plane of the vertical axis about which said member is steered, and means differentially connecting the said cranks.

12. A steerable vehicle supporting truck comprising a member mounted for movement about a generally vertical axis for steering and having a forwardly turned portion, a pair of wheel supported arms pivoted at forward ends to said forwardly turned portion of the member at opposite sides thereof and on longitudinally spaced axes, the said arms being of unequal length to thereby dispose the wheels in substantially transverse alignment with each other at opposite sides of the vertical axis about which said member is steered, and gears differentially connecting the journaled ends of the arms.

13. A steerable vehicle supporting truck comprising a member mounted for movement about a generally vertical axis for steering and having a forwardly turned portion, a pair of wheel supported arms pivoted at forward ends to said forwardly turned portion of the member at opposite sides thereof and on transversely extended and longitudinally spaced axes, the said arms being of unequal length to thereby dispose the wheels in substantially transverse alignment with each other at opposite sides of the vertical axis about which said member is steered, and gears differentially connecting the journaled ends of the arms, one of the said gears being of greater diameter than the other to thereby equalize the load distribution through said arms to the wheels.

14. A vehicle supporting device comprising a housing, a pair of wheel supported arms journaled at forward ends in the housing on transverse, longitudinally spaced axes, for up and down movement at their wheel supported rear ends, gears in the housing and secured to the journaled ends of the arms for differentially connecting the same, and stops in the housing for engagement with one gear to thereby limit said up and down movements of the arms.

ADOLPH RONNING.